United States Patent [19]

Minor et al.

[11] Patent Number: 5,138,699
[45] Date of Patent: Aug. 11, 1992

[54] HARDWARE UTILIZATION OF COLOR INTERPOLATION CAPABILITY IN A COLOR IMAGING SYSTEM

[75] Inventors: Barry L. Minor; Jeffrey A. Wilkinson, both of Austin, Tex.

[73] Assignee: International Business Machines Corporation, Armonk, N.Y.

[21] Appl. No.: 480,190

[22] Filed: Feb. 13, 1990

[51] Int. Cl.$^5$ .............................................. G06F 3/14
[52] U.S. Cl. ...................... 395/131; 395/162
[58] Field of Search .................. 364/518, 521, 522; 340/728, 729; 395/131, 162

[56] References Cited

U.S. PATENT DOCUMENTS

| | | | |
|---|---|---|---|
| 4,468,693 | 8/1984 | Fujita et al. | 358/78 |
| 4,477,833 | 10/1984 | Clark et al. | 358/80 |
| 4,663,655 | 5/1987 | Freeman | 358/41 |
| 4,672,433 | 6/1987 | Yamamoto et al. | 358/80 |
| 4,720,705 | 1/1988 | Gupta et al. | 340/724 |
| 4,796,085 | 1/1989 | Shinada | 358/75 |
| 4,833,531 | 5/1989 | Abe et al. | 358/77 |
| 4,862,391 | 8/1989 | Ohhashi | 364/522 |
| 4,864,357 | 9/1989 | Matsunawa | 355/32 |
| 4,910,683 | 3/1990 | Bishop et al. | 364/522 X |
| 4,912,659 | 3/1990 | Liang | 364/522 X |

FOREIGN PATENT DOCUMENTS 63-50189 3/1988 Japan.

OTHER PUBLICATIONS

"Reconstruction, Manipulation and Display of 3D Objects," by A. Musa and A. Kamel, IBM Kuwait Scientific Center, Nov. 1986.
Foley J D, Van Dam A, "Fundamentals of Interactive Computer Graphics," Addison-Wesley, 1982, pp. 575-591.

*Primary Examiner*—David L. Clark
*Attorney, Agent, or Firm*—Mark E. McBurney

[57] ABSTRACT

A method and means are provided for utilizing, in a color imaging environment, such as ray tracing, display adapter hardware which is capable of interpolating color values for pixels lying in an area between previously color imaged pixels. A computer system CPU performs ray tracing calculations, or the like for a predetermined number of the total pixels, rather then each pixel, as is the case with conventional ray trace image systems. The system CPU then turns over the color imaged pixels to a display adapter, capable of color interpolating therebetween. In this way, previously idle display adapter hardware can be utilized to determine pixel color values and allow the system CPU to continue color imaging other more critical areas of a scene to be displayed. Therefore, an image can be rendered at a much faster rate than possible with conventional systems, with relatively no visible loss in quality.

19 Claims, 3 Drawing Sheets

HARDWARE UTILIZATION OF COLOR INTERPOLATION CAPABILITY IN A COLOR IMAGING SYSTEM

CROSS REFERENCE TO RELATED APPLICATIONS

Co-pending U. S. patent application Ser. No. 07/480,189, filed Feb. 13, 1990 now U. S. Pat. No. 5,031,117.

Co-pending U. S. patent application, entitled "Image Interpolator for an Image Display System," filed Oct. 31, 1988, having Ser. No. 07/264,922, now U. S. Pat. No. 4,988,984.

1. Background of the Invention

The present invention relates generally to the area of computer graphics and more particularly to methods and means for displaying of color images on display hardware. There are at least two distinct methods of placing color values (r,g,b) into the single picture elements (pixels) contained on a hardware screen: "rendering of geometry," and "displaying of image." "Rendering of geometry" is a method in which objects to be displayed on the screen are expressed as polygons. Vertices of these polygons have associated color values determined by calculations (lighting operations) performed at each rendering. Pixels, chosen at each rendering, are given these color values to display the vertices. Remaining pixels are given color values via "shading". "Shading" is the process of filling in the rest of the pixels that comprise a polygon during "rendering of geometry." Color values for these pixels are calculated from information known about the vertices of the polygon. "Gouraud shading" is one method of shading in which the color values of the vertices are color interpolated to derive the color values for the remaining pixels of the polygon. There are other methods of shading which do not involve color interpolation. In contrast to "rendering of geometry," pixels may be given color values by simply filling them in from an array of color values called an "image." In this case there are no established objects or polygons expressed to the display hardware. Such an image may have been obtained from a camera, or from a process of calculating color values such as "ray tracing." "Ray tracing" is a computation intensive method of calculating color values for a pixel. Typically, a computer system central processing unit (CPU) is utilized to perform these imaging computations. In these conventional systems, the CPU performs all of the imaging (ray tracing) computations for each and every pixel on a display screen in sequential order. For a detailed discussion of ray tracing, see "An Overview of Ray Tracing," Andrew S. Glassner. It can be seen that imaging computations in general and ray tracing in particular are extremely time consuming and may take a matter of hours, or even days to complete this color imaging, depending upon the description of the screen being displayed. The combination of calculating and displaying an image, may be called "color imaging."

Generally, a number of currently available computer display adapter hardware devices are capable of performing rendering of geometry, including Gouraud shading. Gouraud shading is a graphics technique unrelated to color imaging, or ray tracing. Since Gouraud shading is implemented through color interpolation, these display adapters are capable of performing color interpolation. The present invention utilizes this color interpolation capability to achieve a goal not contemplated by the conventional and standard uses of Gouraud shading.

During the period when a CPU is performing the ray tracing calculation, all other associated computer graphics hardware remains idle, awaiting completion of these computations. Therefore, it would be extremely desirable to provide a method which would optimize the efficiency of a computer graphic system by utilizing the capabilities of this idle graphics hardware in conjunction with the processing being conducted by the system CPU.

SUMMARY OF THE INVENTION

In contrast to the prior art, the present invention allows a microprocessor included within an associated display adapter to be used to alleviate a portion of the computational burden imposed upon the system CPU during color imaging calculations. The present invention utilizes the color interpolation capability of associated display hardware to increase the speed of a computer graphics system performing color imaging.

Initially, the system CPU performs color imaging (e.g. ray tracing) on a predetermined plurality of pixels. At this point, the CPU then transmits the (r,g,b) values for each of these pixels to the processor of the display adapter hardware. The expression (i.e. communication between the CPU and display adapter) to the hardware, of these color values is in terms of a polygon to be Gouraud shaded, even though "rendering of geometry" is not the method being used. Upon receipt of these pixel color values, the display adapter processor then performs color interpolation for all of the pixels included within a geometric figure bounded by the color imaged pixels. Thus, it can be seen that the number of calculations required to be performed for a given screen description is vastly reduced. This reduction in calculations greatly improves the speed with which the scene can be color imaged.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Typically, a computer graphics user that wishes to perform lighting calculations will utilize a three-dimensional (3D) display adapter hardware device 16, such as a 2781 (High-Performance 3D Color Graphics Processor), sold by IBM. Included within the 3D lighting hardware is a portion which is dedicated to performing shading operations. Usually, this shading hardware supports Gouraud shading, as discussed above, however other shading hardware utilizing color interpolation methods are contemplated by the scope of the present invention. During a normal lighting operation, the shading hardware is utilized as a hardware assist to aid the system CPU in achieving the desired lighting of a displayed image. The present invention utilizes this hardware assist capability during non-lighting calculations, in particular during color imaging, such as ray tracing operations.

Figure 1:
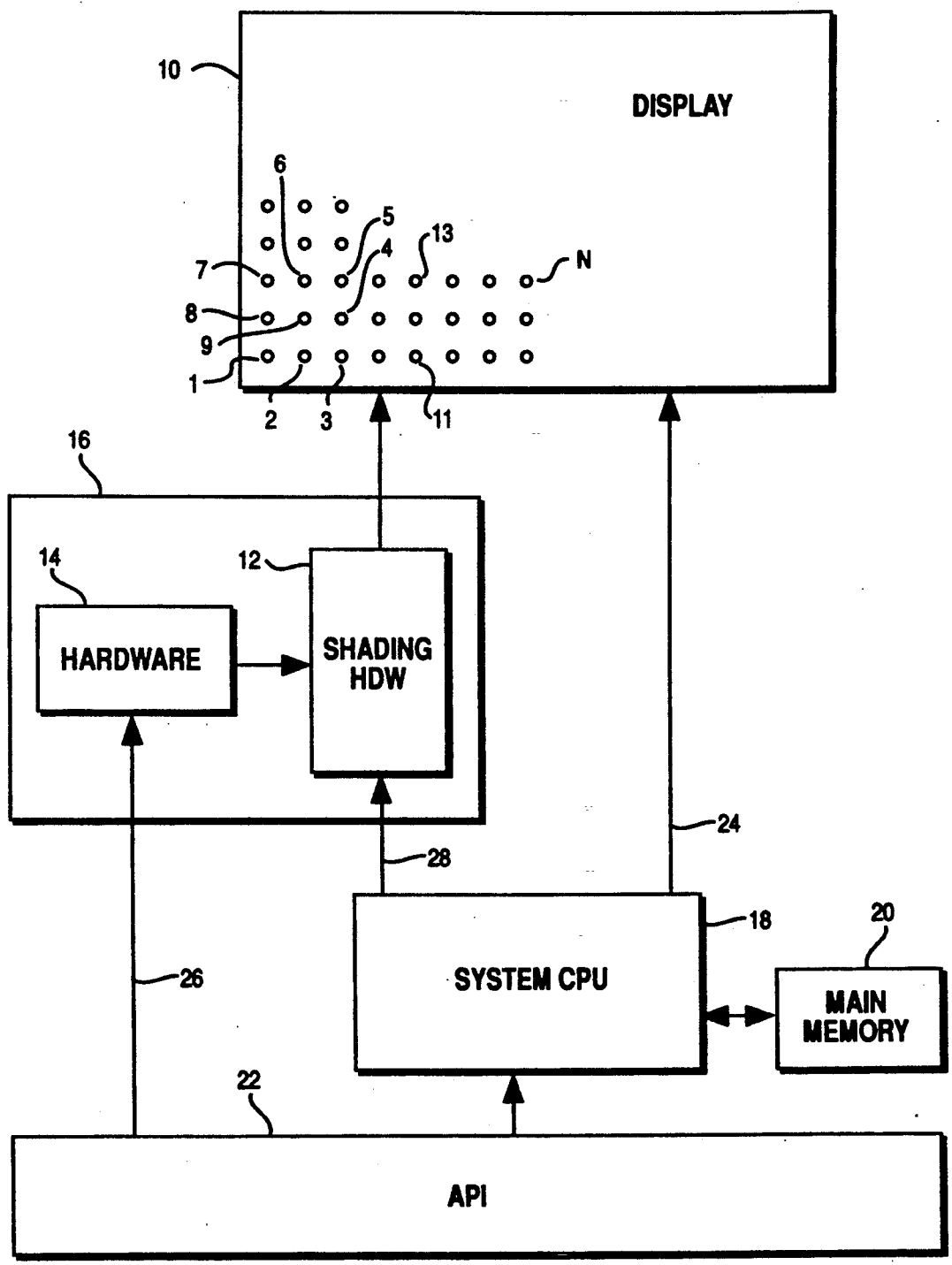
FIG. 1 is a block diagram depicting the elements utilized by the present invention.

Referring to FIG. 1, a block diagram of a system capable of utilizing the present invention is shown. A display 10, such as a CRT, or the like is shown having a plurality of picture elements (pixels) which are depicted by reference numerals 1, 2, 3, 4, 5, 6, 7, 8, 9, 11, 13 and N. A display adapter 16 typically used for performing rendering of geometry is illustrated and includes a shading processor 12 and all other associated hardware 14. This hardware may include buffers, such as a frame buffer, window buffer, Z-buffer or the like. A system CPU 18 is provided which performs all color imaging, such as ray tracing calculations. Also shown in FIG. 1 is the system main memory 20. It should be noted that the present invention is suited for use in all types of color imaging applications, however ray tracing is the primary method discussed herein.

Conventionally, an application program interface (API) 22, via bus 26, instructs the 3D lighting display adapter to perform rendering of geometry. This may include determining the location and consequences of a light source, as well as color interpolating a surface for shading purposes. It should be noted that in conventional systems, no color imaging is performed by CPU 18 during rendering of geometry. Similarly, no rendering of geometry can be performed by prior art systems during the time color imaging computations are being implemented by CPU 18.

To perform color imaging in a ray tracing environment a scene description is first stored in main memory 20. This scene description is a textual, or alphanumeric representation of the scene to be displayed. For example, a scene description will include geometric descriptions of all objects as well as their color (r,g,b) values and surface type. Additionally, the nature of each object, is included within the scene description, that is, whether the object is transparent, opaque, reflective or the like.

Upon implementation of a ray tracing operation, a program application user, via API 22 and bus 23, instructs the system CPU to perform a series of vector (ray) calculations for each pixel on display 10. System CPU 18 begins at pixel 1 and back traces a ray from a view point directly in front of that pixel, through the pixel in the image plane, and into the scene. For example, if a ray 1 (corresponding to pixel 1) is found to initially intersect the surface of the ocean, then a lighting calculation is computed at the point of intersection between ray 1 and the surface and CPU 18 colors pixel 1 the computed shade. In this example, many floating point vector calculations are performed by CPU 18. Furthermore, if at pixel N the corresponding scene description is a convex reflective object, such as a mirrored sphere, then the ray tracing calculation includes back tracing along a first ray from the view point through pixel N to the point of intersection with the reflective surface, calculating the angle of reflection to create a reflection ray which is then traced to find its nearest intersection with an object. These reflection rays are created and traced until an intersection is found with a non-reflective object, at which point a shadow ray is created which is a ray from the point of intersection to the light source. If any intervening intersections are found along this ray, i.e. intersection with other objects, then the primary intersection point is found to be in a shadow and the lighting calculation, performed by the CPU 18 is adjusted accordingly. Upon completion of the lighting calculation at this point of intersection, pixel N is colored with the calculated shade. Thus, it can be seen how a number of reflective objects in the scene description can create an extremely time consuming and burdensome number of calculations to be performed by CPU 18. It is not uncommon for a period of hours or even days to elapse before a scene description is totally displayed on a CRT 10. This time lapse can cause a enormous burden on users of computer graphics systems. For example, a user of a computer graphics animation system may have to wait all day for the scene contemplated to be actually displayed such that it can be determined whether the scene description needs to be altered. It should be noted that display adapter 16 represents the previously described lighting hardware and processor 12, the shading hardware portion of display adapter 16.

Upon completion of the ray tracing computation, the CPU 18 then transmits, via bus 24, the calculated color for that pixel to the display 10. Again, during the ray tracing calculation, display adapter 16, including shading processor 12 remains idle. In order to increase rendering speed, or more efficiently perform color imaging, the present invention, utilizes shading processor 12 to color a percentage of an image's pixels through color interpolations of a subset of the ray traced pixels.

A number of display adapters, such as the aforementioned 3D lighting hardware 16, are capable of filling (coloring) polygons onto display 10. Under typical color image operating conditions CPU 18 resolves individual pixels, as specified by a program application and then turns these pixels directly over to the CRT 10 for display. However, adapter 16, through shading processor 12, is capable of coloring polygons by interpolation methods, such as Gouraud shading, or the like. Generally, these polygons are simple polygons, such as squares, rectangles, triangles, and trapezoids. Therefore, the present invention exploits this capability of the display adapter hardware 16 to color interpolate simple polygons.

Specifically, a user of the computer graphics system of FIG. 1 determines the number (or percentage) of pixels to be color imaged, or ray traced, prior to the color interpolation being performed therebetween. For example, a user may desire that every other (one out of two) pixels be ray traced, such that pixels 1, 3, 5, and 7 are subjected to ray tracing calculations in sequential order. Upon completion of these four computations by CPU 18, their respective color values are passed to the shading processor 12, via bus 28, of display adapter 16. In this example pixels 1, 3, 5 and 7 are the boundaries of a square, which is a polygon the display adapter 16 is capable of filling. Thus the CPU 18 is now free to continue ray tracing for another portion of the scene description, such as that portion bounded by pixels 3, 5, 11 and 13. Meanwhile, shading processor 12 of display adapter 16 has interpolated the color of pixels 2, 4, 6, 8 and 9 from the known ray traced colors of pixels 1, 3, 5 and 7. Thus, it is apparent how the present invention greatly increases the speed with which a ray traced image in a graphics system is rendered. That is, of pixels, 1 through 9, shown in FIG. 1, only four pixels 1, 3, 5 and 7 are actually ray traced, whereas five pixels 2, 3, 6, 8 and 9 are colored by another processor. It should be noted that a user may choose the number and configuration of pixels to be ray traced. At one extreme, the four corner pixels of a display 10 may be ray traced with the remaining pixels of the screen being color interpolated. The other extreme may provide for ray tracing a high percentage of the total pixels, along the rows and columns of pixels on display 10 (see FIG. 3). By ray tracing one out of every 2 pixels, only 25percent of the total pixels are eventually subject to ray tracing operations. Ray tracing every other pixel, as discussed above, has greatly increased rendering speed with an extremely minor deterioration in resolution. This minor deterioration in resolution is far outweighed by the increased rendering speed.

Figure 2:
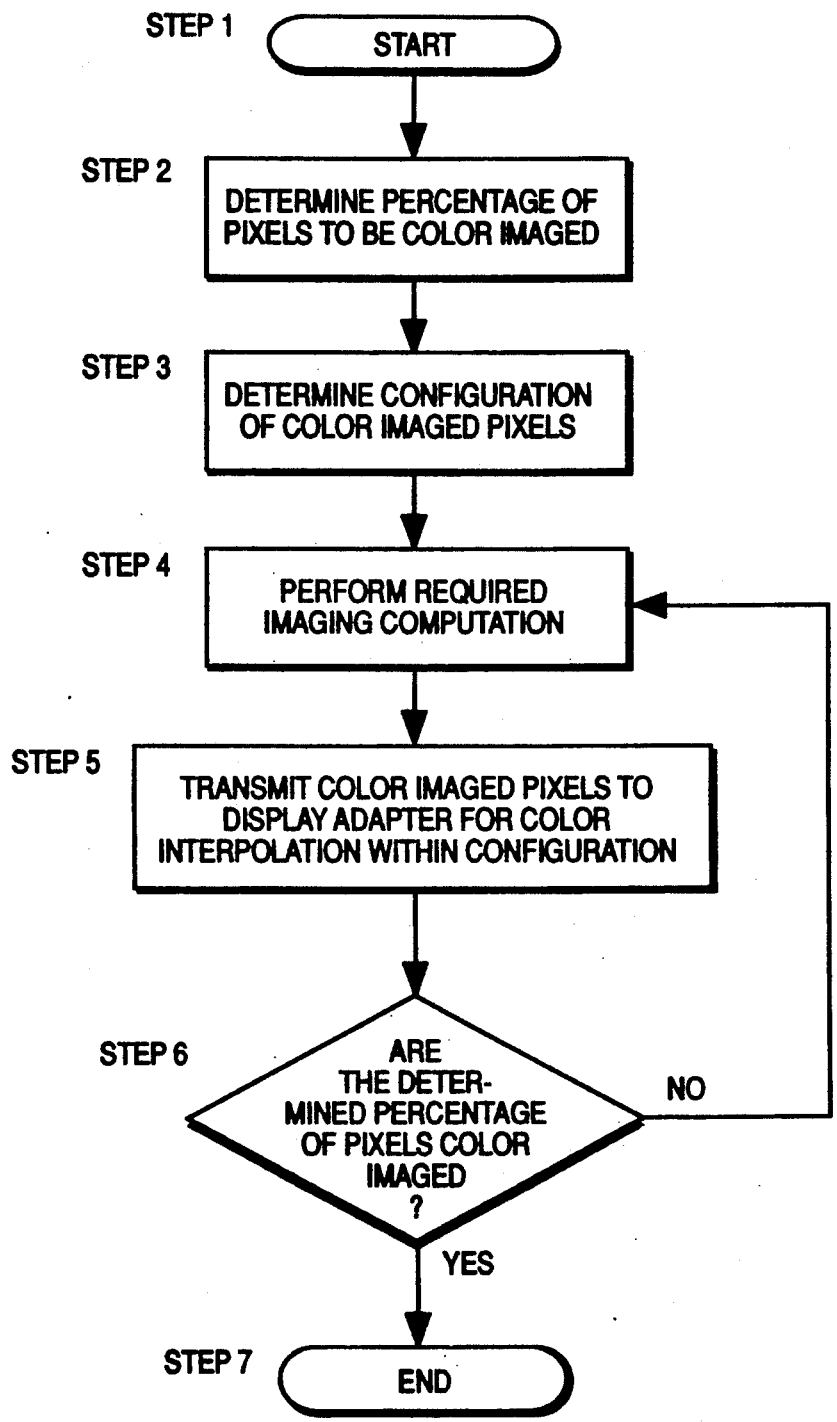
FIG. 2, is a flowchart showing the steps required by the present invention to implement the capabilities of the display adapter hardware.

FIG. 2 is a flowchart showing the steps required by the present invention to invoke and utilize the capability of the shading processor 12.

At step 1, the hardware utilization method is initiated by a user of a computer graphics system. Next the user, or perhaps an associated program application, will determine a percentage of pixels which are to be ray traced. This percentage may range from a minute portion of the total pixels, up to 100% in which case the entire screen (all pixels) will be ray traced and the present invention will not be used. As noted above, approximately 25% has been determined to give good resolution and a vastly increased rate of imaging. Step 3 determines the configuration of ray traced pixels which will be turned over to the display adapter 16 for filling. That is, the configuration of the ray traced pixels as a square, circle, rectangle, trapezoid or other polygon will be determined, thus allowing the display adapter to fill the area (pixels) lying between these polygonally configured ray traced pixels.

The actual ray tracing computations are then performed by CPU 18 of the computer graphics system (step 4). At step 5, the color values for these ray traced pixels and their configuration is then transmitted to the display adapter 16 from CPU 18 and via bus 28. Also at step 5, shading processor 12 fills (color interpolates) the pixels lying between these ray traced pixels and displays the ray traced and color interpolated pixels as a filled polygon, on display 10. Step 6 determines whether the percentage of pixels to be ray traced (determined at step 2) have actually been ray traced. If so, then the method of the present invention proceeds to step 7 and ends. However, if there are pixels remaining to be ray traced, then the method returns to step 4 where additional ray tracing is performed. Also, it should be noted that step 7 ends the process of the present invention, but the CPU 18 may continue ray tracing, and color image the previously color interpolated pixels.

Figure 3:
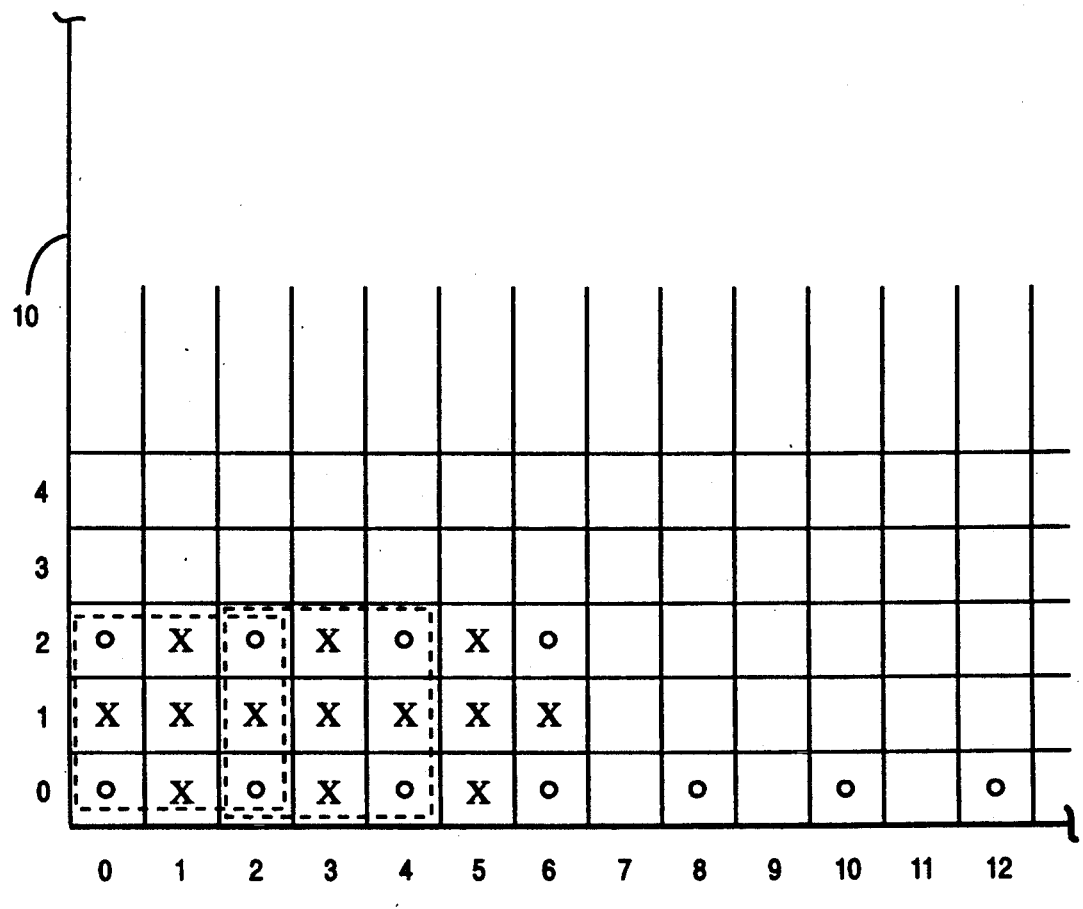
FIG. 3 is a diagram of a portion of a display showing those pixels which may be color interpolated and those being color imaged by a system utilizing the present invention.

FIG. 3 shows another configuration of pixels on display 10. It should be noted that dots represent color imaged pixels and X's represent color interpolated pixels. To invoke the configuration of FIG. 3, CPU 18 would color image every other pixel along the first line (row 0) of display 10, i.e. pixels 0, 2, 4, 6, 8, 10, 12 . . . . Next, CPU 18 will ray trace pixels 0,2 of row 2 such that a polygon (in this case a square) is bounded by pixels 0,2 of row 0 and pixels 0,2 of row 2. This polygon is then transmitted to shading processor 12 which color interpolates values for pixel 1 of row 0, pixels 0,1,2 of row 1 and pixel 1 of row 2. This block of pixels is then displayed on CRT 10.

Simultaneous to display of the first block of pixels, CPU 18 color images pixel of 4 row 2, which forms another square, since the remaining three bounding pixels have previously been ray traced. This second block is then color interpolated by shading processor 12 and values for pixel 3 of row 0, pixels 3,4 of row 1 and pixel 3 of row 2 are found. Therefore, it can be seen how by ray tracing one additional pixel, such as pixel 4 of row 2, four pixels may then be color interpolated. Further, it can be seen how imaging pixel 6 of row 2 would allow another four pixels to be color interpolated and so forth. In this manner, i.e. using processor 12 as a hardware assist to color imaging, the thousands of pixels present on a typical CRT can be color imaged and color interpolated to display a complex scene which would otherwise take a matter of hours or even days to display.

Although certain preferred embodiments have been shown and described it should be understood that many changes and modifications may be made therein without departing from the scope of the appended claims.

What is claimed is:

1. A method of displaying color images on a computer system having a central processing unit and display adapter by interpolating pixel color values, said method comprising the steps of:
   determining a number of pixels to be color imaged;
   computing, by said central processing unit, color imaged values for each of said pixels included within said determined number; and
   interpolating, by said display adapter, color values for each pixel not included within said determined number based upon the computed color imaged pixels.

2. A method according to claim 1 wherein said step of determining further comprises the step of determining a particular configuration area for a portion of the determined number of pixels.

3. A method according to claim 2 wherein the step of interpolating further comprises the step of assigning a color value for only those pixels included within said determined configuration area.

4. A method according to claim 3 wherein the step of interpolating further comprises the steps of:
   interpolating color values for only those pixels contained within said determined configuration area; and
   displaying the color imaged pixels and the color interpolated pixels included within said determined configuration.

5. A method according to claim 4 wherein said step of computing color values comprises the step of performing ray tracing operations.

6. A method of displaying color images on a computer system having a central processing unit and display adapter by interpolating pixel color values, said method comprising the steps of:
   determining a number of pixels to be color imaged;
   computing color, by said central processing unit, imaged values for each of said pixels included within said determined number;
   determining a particular configuration area for a portion of said predetermined number of pixels, said configuration area being bound by said color imaged pixels;
   interpolating color, by said display adapter, color values for each pixel not included within said determined number based upon the computed color imaged pixels; and displaying the color imaged pixels and the color interpolated pixels, included within said determined configuration.

7. A computer program being executed in conjunction with a computer system having a central processing unit and display adapter for displaying color images by interpolating pixel color values, comprising:

means for determining a number of pixels to be color imaged;

means for causing said central processing unit to compute color imaged values for each of said pixels included within said determined number; and means for instructing said display adapter to interpolate color values for each pixel not included within said determined number based upon the computed color imaged pixels.

8. A computer program according to claim 7 wherein said means for determining comprises second means for determining a particular configuration area for a portion of the determined number of pixels.

9. A computer program according to claim 8 wherein said means for instructing further comprises means for assigning a color value for only those pixels included within said determined configuration area.

10. A computer program according to claim 9 wherein said means for instructing further comprising:

means for interpolating only those color values for pixels contained within said determined configuration area; and means for displaying the color imaged pixels and the color interpolated pixels included within said determined configuration.

11. A computer program according to claim 10 wherein said central processing unit comprises means for performing ray tracing operations.

12. A computer program being executed in conjunction with a computer system having a central processing unit and display adapter for displaying color images by interpolating pixel color values, comprising:

means for determining a number of pixels to be color imaged;

means for causing said central processing unit to compute color imaged values for each of said pixels included within said determined number;

means for determining a particular configuration area for a portion of said determined number of pixels, said configuration area being bound by said color imaged pixels;

means for instructing said display adapter to interpolate color values for each pixel not included within said determined number based upon the computed color imaged pixels; and means for displaying the color imaged pixels and the color interpolated pixels, included within said determined configuration.

13. A system for displaying color images by interpolating pixel color values, comprising:

means for determining a number of pixels to be color imaged;

means for computing color imaged values for each of said pixels included within said determined number; and means for interpolating color values for each pixel not included within said determined number based upon the computed color imaged pixels.

14. A system according to claim 13 wherein said means for interpolating comprises means for invoking display hardware capable of performing color interpolation.

15. A system according to claim 14 wherein said means for determining comprises second means for determining a particular configuration area for a portion of the determined number of pixels.

16. A system according to claim 15 wherein said means for interpolating further comprises means for assigning a color value for only those pixels included within said determined configuration area.

17. A system according to claim 16 wherein said means for interpolating further comprises:

second means for interpolating only those color values for pixels contained within said determined configuration area; and means for displaying the color imaged pixels and the color interpolated pixels included within said determined configuration.

18. A system according to claim 17 wherein said means for computing color values comprises means for performing ray tracing operations.

19. A system for displaying color images by interpolating pixel color values, comprising:

means for determining a number of pixels to be color imaged;

means for computing color imaged values for each of said pixels included within said determined number;

means for determining a particular configuration area for a portion of said determined number of pixels, said configuration area being bound by said color imaged pixels;

means for interpolating color values for each pixel not included within said determined number based upon the computed color imaged pixels, by invoking display hardware capable of performing color interpolation; and means for displaying the color imaged pixels and the color interpolated pixels, included within said determined configuration.

* * * * *